(12) United States Patent
Heiniö

(10) Patent No.: US 9,714,796 B2
(45) Date of Patent: Jul. 25, 2017

(54) PLATE HEAT EXCHANGER AND METHOD FOR MANUFACTURING OF A PLATE HEAT EXCHANGER

(71) Applicant: VAHTERUS OY, Kalanti (FI)

(72) Inventor: Tapio Heiniö, Uusikaupunki (FI)

(73) Assignee: VAHTERUS OY, Kalanti (FI)

(*) Notice: Subject to any disclaimer, the term of this patent is extended or adjusted under 35 U.S.C. 154(b) by 426 days.

(21) Appl. No.: 14/357,937

(22) PCT Filed: Nov. 16, 2012

(86) PCT No.: PCT/FI2012/051129
§ 371 (c)(1),
(2) Date: May 13, 2014

(87) PCT Pub. No.: WO2013/072566
PCT Pub. Date: May 23, 2013

(65) Prior Publication Data
US 2014/0305620 A1  Oct. 16, 2014

(30) Foreign Application Priority Data
Nov. 16, 2011 (EP) .................................. 11189322

(51) Int. Cl.
*F28F 9/22* (2006.01)
*F28D 9/00* (2006.01)
(Continued)

(52) U.S. Cl.
CPC ............... *F28F 3/08* (2013.01); *B23P 15/26* (2013.01); *F28D 9/0006* (2013.01);
(Continued)

(58) Field of Classification Search
CPC .. F28F 9/22; F28F 2009/224; F28F 2009/226; F28D 9/006; F28D 9/0012; B23P 15/26
(Continued)

(56) References Cited

U.S. PATENT DOCUMENTS 2,821,369 A * 1/1958 Hilliard ..................... F28F 7/02
165/145
3,731,733 A * 5/1973 Trepaud .................... F28D 7/08
165/161

(Continued)

FOREIGN PATENT DOCUMENTS

EP        0744587 A1 * 11/1996 ............ F28F 9/0241
WO    WO 89/00671       1/1989
(Continued)

OTHER PUBLICATIONS

International Search Report for PCT/FI2012/051129 mailed Apr. 5, 2013.
(Continued)

*Primary Examiner* — Leonard R Leo
(74) *Attorney, Agent, or Firm* — Nixon & Vanderhye P.C.

(57) ABSTRACT

A Plate and Shell type plate heat exchanger, which comprises an inner shell (9) completely surrounding a plate pack (2) and inner end plates (11a, 11b) in the direction of the ends of the plate pack. The inner shell (9) is by its inner surface arranged into contact with the outer edge of the baffle plates (8a, 8b) arranged on the surface of the plate pack and by its outer surface the inner shell (9) is arranged to support itself against the inner surface of the shell (3) of the outer casing of the heat exchanger. The inner end plates (11a, 11b) are supported by their outer surface against the inner surface of the end plates (4a, 4b) of the outer casing.

17 Claims, 3 Drawing Sheets

(51) Int. Cl.
  *F28F 3/08* (2006.01)
  *F28F 9/00* (2006.01)
  *B23P 15/26* (2006.01)

(52) U.S. Cl.
  CPC .............. *F28D 9/0012* (2013.01); *F28F 9/00* (2013.01); *F28F 9/22* (2013.01); *F28F 2009/224* (2013.01); *F28F 2009/226* (2013.01); *F28F 2225/02* (2013.01); *Y10T 29/49366* (2015.01)

(58) Field of Classification Search
  USPC ................................. 165/145, 157, 161, 166
  See application file for complete search history.

(56) References Cited

U.S. PATENT DOCUMENTS

| | | | | |
|---|---|---|---|---|
| 4,249,596 A | * | 2/1981 | Tutak | B01D 5/0009 165/161 |
| 4,441,549 A | * | 4/1984 | Vasiliev | C10G 1/02 165/145 |
| 4,548,260 A | * | 10/1985 | Stachura | F28D 7/1646 165/160 |
| 4,667,734 A | * | 5/1987 | Langle | F28D 7/0058 165/145 |
| 5,088,552 A | | 2/1992 | Raunio | |
| 2003/0116305 A1 | | 6/2003 | Beddome et al. | |
| 2004/0031600 A1 | | 2/2004 | Kontu | |
| 2004/0251007 A1 | * | 12/2004 | Toh | F17C 1/00 165/157 |
| 2005/0072662 A1 | | 4/2005 | Holtzapple et al. | |
| 2008/0179049 A1 | | 7/2008 | Mathur et al. | |
| 2013/0277028 A1 | | 10/2013 | Heiniö et al. | |

FOREIGN PATENT DOCUMENTS

| | | |
|---|---|---|
| WO | WO 02/16852 | 2/2002 |
| WO | WO 2008/046952 | 4/2008 |
| WO | WO 2012/089927 | 7/2012 |

OTHER PUBLICATIONS

International Preliminary Report on Patentability dated Sep. 11, 2013.
Search Report for EP 11189322.8 dated Apr. 17, 2012.

* cited by examiner

PLATE HEAT EXCHANGER AND METHOD FOR MANUFACTURING OF A PLATE HEAT EXCHANGER

This application is the U.S. national phase of International Application No. PCT/FI2012/051129 filed 16 Nov. 2012 which designated the U.S. and claims priority to EP 11189322.8 filed 16 Nov. 2011, the entire contents of each of which are hereby incorporated by reference.

FIELD OF THE INVENTION

The invention relates to a plate heat exchanger and a method for manufacturing it according to the preamble of the independent claims presented below.

BACKGROUND OF THE INVENTION

Plate and Shell type welded plate heat exchangers are previously known, which are composed of a plate pack formed by heat exchange plates and a shell surrounding it, functioning as a pressure vessel. The core of the heat exchanger is usually formed by a plate pack composed of circular heat exchange plates, where the plates have been welded tightly together at openings therein and/or at the perimeters of the plates. A primary circuit of the heat exchanger is formed between the openings in the plates and a secondary circuit between connections of the shell surrounding the plate pack, so that a primary side flow medium flows in every other plate space and a secondary side flow medium in every other plate space. In heat exchangers of this type the flow connections of the pack side are usually placed in the ends of the heat exchanger and the flow connections of the shell side in the shell. Due to the small openings in the heat exchange plates the flow pattern of the pack side is not the best possible, as a large part of the flow strives to pass through the middle part of the heat exchange plate. A disadvantage of heat exchangers of the Plate and Shell type is also that separate flow guides are needed on the shell side, which are used to prevent bypass flow between the plate pack and the shell. Construction of the flow guides to be completely tight has been discovered to be a difficult task. In order to obtain a sufficient tightness, the flow guides are manufactured from flexible materials, such as rubber or corresponding materials. A Plate and Shell type plate heat exchanger is described for example in patent publication WO 2008/046952.

A so-called Raucell type welded plate heat exchanger is also previously known. A constructive disadvantage with the Raucell type heat exchangers is, especially when performing at high pressures, the lack of a solid shell structure manufactured for example from pressure vessel steel. Because the stacked plates of the plate pack are welded together by their outer edges, this structure makes up the outer shell of the plate heat exchanger, which shell also functions as a pressure vessel. Therefore Raucell type plate heat exchangers are best suited for low pressures. Pipes, which have partly been split in the longitudinal direction, have been welded to the sides of the plate pack as connections for the plate pack. These split pipes function as bypass manifolds for the heat exchanger. Due to the small size of the bypass manifolds for heat exchange mediums, the heat exchange surface of the heat exchange plates is also in this type of exchanger not utilised fully. A Raucell type plate heat exchanger is described for example in patent publication WO 89/00671.

Patent publication WO2012/089927 shows a welded plate heat exchanger, where all the heat exchange mediums are led to the welded circular plate pack from its outer perimeters and removed via the outer perimeters along flow channels, the cross-sections of which have the shape of a section of a circular ring, which flow channels are formed between the outer surface of the plate pack, the inner surface of the outer shell, the radial baffle plates arranged on the outer surface of the plate pack and the ends of the heat exchanger. The structure presented in the application is advantageous as a pressure vessel, but the heat exchange occurs according to a cross-flow principle, whereby it is not possible to obtain so-called cross temperatures, which are possible with counter-flow exchangers. An advantage of the construction shown in the application is a completely welded structure, whereby rubber-sealed flow guides are not needed. The costs of the structure according to the application however grow significantly if it is desired to reduce the corrosion risk of the heat exchanger, because the outer shell of the heat exchanger must thus be manufactured from the same material as the heat exchange plates.

DESCRIPTION OF THE INVENTION

It is an object of the present invention to present a structure for a plate heat exchanger, which reduces or even eliminates the above-mentioned problems appearing in prior art.

It is an object of the invention to present a structurally simple plate heat exchanger, where the heat exchange surfaces can be utilised more efficiently than in previously known plate heat exchangers. It is also an object of the invention to reduce manufacturing costs of a plate heat exchanger.

It is an object of the invention to provide a plate heat exchanger, which is highly resistant to pressure.

The plate heat exchanger and method for manufacturing a plate heat exchanger according to the invention are characterised in what is presented in the enclosed independent claims.

The other, dependent claims present some preferred embodiments of the invention.

The embodiments and advantages mentioned in this text are in suitable parts applicable to both a plate heat exchanger and a method according to the invention, even if this is not always specifically mentioned.

A typical plate heat exchanger according to the invention comprises
- a plate pack formed by heat exchange plates arranged on top of each other,
- an outer casing surrounding the plate pack, which casing comprises end plates mainly in the direction of the ends of the plate pack and a shell connecting the end plates, which shell is arranged at least mainly at a distance from the outer surface of the plate pack defined by the outer edges of the heat exchange plates of the plate pack,
- inlet and outlet connections for at least a first and a second heat exchange medium,
- baffle plates in the longitudinal direction of the plate pack, which are arranged on the outer surface of the plate pack substantially perpendicular to the plate pack, which baffle plates comprise an inner edge and an outer edge, and which baffle plates are arranged to be in contact by their inner edge with the outer surface of the plate pack, and
- a flow channel from the inlet connection to the plate pack and a flow channel from the plate pack to the outlet connection for at least a first and a second heat exchange medium, which flow channels are formed between the baffle plates, and which heat exchanger further comprises an inner shell surrounding the plate pack, which inner shell is by its inner surface arranged to be in contact with the outer edge of the baffle plates and by its outer surface the inner shell is supported against the inner surface of the shell of the outer casing, and inner end plates, which are supported by their outer surface against the inner surface of the end plates of the outer casing.

A typical method according to the invention for manufacturing a plate heat exchanger comprises forming a plate pack, where heat exchange plates have been attached together on top of each other, arranging an outer casing around the plate pack, which casing comprises end plates mainly in the direction of the ends of the plate pack and a shell connecting the end plates, which shell is arranged at least mainly at a distance from the outer surface of the plate pack defined by the outer edges of the heat exchange plates of the plate pack, arranging inlet and outlet connections for at least a first and a second heat exchange medium, arranging baffle plates in the longitudinal direction of the plate pack on the outer surface of the plate pack substantially perpendicular to the plate pack, which baffle plates comprise an inner edge and an outer edge, and which baffle plates are arranged to be in contact by their inner edge with the outer surface of the plate pack, and forming a flow channel between the baffle plates from the inlet connection to the plate pack and a flow channel from the plate pack to the outlet connection for at least a first and a second heat exchange medium, and which method further comprises arranging an inner shell around the plate pack, which inner shell is arranged by its inner surface to be in contact with the outer edge of the baffle plates and by its outer surface the inner shell is supported against the inner surface of the shell of the outer casing, and arranging inner end plates against the inner surface of the end plates of the outer casing.

In the heat exchanger according to the invention the shell surrounding the plate pack is arranged at a distance from the outer surface of the plate pack, whereby flow channels for heat exchange mediums can with the aid of baffle plates arranged on the outer surface of the plate pack be formed in the space between the shell and the plate pack from the inlet connection to the plate pack and from the plate pack to the outlet connection, whereby the leading of heat exchange mediums into the plate pack occurs from the outer surface of the plate pack. The structure of the heat exchanger according to the invention has been made very highly resistant to pressure, when a separate inner shell has been arranged inside the shell of the outer casing of the heat exchanger functioning as a pressure vessel, which inner shell is pressed against the inner surface of the outer shell and thus has the same shape as the inner surface of the outer shell. In the structure of the heat exchanger according to the invention the plate pack is thus surrounded by two shells, an internal shell and an external shell. The internal shell, the so-called inner shell, is attached on the baffle plates, which are arranged on the outer surface of the plate pack and substantially perpendicular to the plate pack. The inner shell is thus by its inner surface attached to the baffle plates and by its outer surface the inner shell is supported against the inner surface of the outermost shell, the so-called shell of the outer casing. The inner shell is arranged to completely surround the plate pack.

In the structure according to the invention the inner shell supports the structure formed by the plate pack and the baffle plates. The separate inner shell can further be manufactured from the same material as the heat exchange plates forming the plate pack, as a result of which mixed-structure welding seams can be avoided in the structure according to the invention, for example stainless steel (the heat exchange plates, the baffle plates, the inner shell and the inner end plates) and carbon steel (the outer casing of the heat exchanger) do not need to be joined together. In a preferred embodiment of the invention the inner shell, the inner end plates, the baffle plates and the heat exchange plates of the plate pack have been manufactured from the same material, which material differs from the material of the outer casing. In the heat exchanger according to the invention the inner shell is advantageously manufactured from a material, which moves sufficiently due to the internal pressure of the heat exchanger and thus the inner shell changes shape according to the inner surface of the outer shell functioning as a pressure vessel. In a preferred embodiment of the invention the inner shell has not been fixed to the shell of the outer casing.

The heat exchanger according to the invention also has inner end plates in the direction of the end plates of the plate pack, which inner end plates are solidly attached to the inner shell, and which are supported by their outer surface against the inner surface of the end plates of the outer casing. The inner end plates are arranged tightly against the end plates of the outer shell.

The flow channels for heat exchange mediums of the heat exchanger according to the invention are formed between the outer surface of the plate pack, the inner surface of the inner shell, the inner end plates and the baffle plates attached to the plate pack. The baffle plates arranged on the outer surface of the plate pack extend in the longitudinal direction of the plate pack from the first inner end plate of the heat exchanger to the second inner end plate. Thus the flow channels for heat exchange mediums are formed to be the length of the entire plate pack and thus the entire heat exchange surface area of the plate pack formed by heat exchange plates can be efficiently utilised. The baffle plates are tightly attached, for example welded, by their inner edge to the plate pack, by their outer edge to the inner surface of the inner shell and by their ends to the inner end plates.

In the heat exchanger according to the invention also the baffle plates function as heat exchange surfaces. The baffle plates function as an especially efficient heat exchange surface in an embodiment of the invention, where on a first side of one baffle plate there is the flow channel of a heat-yielding heat exchange medium and on the second side the flow channel of a heat-receiving heat exchange medium.

The height of the baffle plates, i.e. the distance between the inner surface of the inner shell of the heat exchanger and the outer surface of the plate pack, can for example be 5-200 mm or 10-150 mm or 20-100 mm. The diameter of the heat exchange plates is typically about 200-1400 mm.

In one embodiment of the invention the baffle plates are mainly straight. In one embodiment of the invention the baffle plate is arranged at a mainly right angle, for example an angle of 85-95 degrees or 89-91 degrees, in relation to the surface or surfaces it is attached to. In one embodiment of the invention the baffle plate is arranged at a mainly right angle in relation to the outer surface of the plate pack or a tangent of the outer surface. In one embodiment of the invention the baffle plate is arranged at a mainly right angle in relation to the inner surface of the inner shell or a tangent of the inner surface. In one embodiment of the invention the baffle plates are arranged at a mainly right angle in relation to the inner surface of the inner end plate.

The heat exchanger according to the invention does not have a separate shell and pack side, such as in Plate and Shell type heat exchangers, but the primary and secondary sides are to their basic structures the same. The heat exchanger according to the invention comprises a flow channel for at least a first and a second heat exchange medium from the inlet connection to the plate pack and a flow channel from the plate pack to the outlet connection, whereby the heat exchange mediums are fed from the flow channel into the plate pack and removed from the plate pack into the flow channel through the outer surface of the plate pack. Both the primary and secondary side heat exchange mediums are fed into the plate pack from its outer perimeter, in the same way as the shell side flow in heat exchangers of the Plate and Shell type.

In one embodiment of the heat exchanger according to the invention, which has inlet and outlet connections for a first and second heat exchange medium, the heat exchange mediums are led via their inlet connections to a flow channel delimited by the inner shell of the heat exchanger, the outer surface of the plate pack and the baffle plates. Via these flow channels the flow of the first and second heat exchange medium can be led through the plate pack advantageously over the entire length of the plate pack, so that the first heat exchange medium flows in every other plate space of the plate pack and the second heat exchange medium in every other plate space, whereafter the flow of the first and second heat exchange medium is led through their outlet connections out of the heat exchanger. The plate spaces are closed at the edges of the heat exchange plates, so that the plate spaces meant for the second heat exchange medium are closed in the flow channels for the first heat exchange medium. On the other hand, the plate spaces meant for the first heat exchange medium are closed in the flow channels for the second heat exchange medium.

An advantage of the heat exchanger according to the invention is also the thermal versatility of the heat exchanger, because the length of the heat exchange surfaces on both the primary and the secondary side can be freely selected by arranging in the structure of the heat exchanger a desired number of dividing plates in the direction of the heat exchange plates between the plate pack and the inner shell, by means of which dividing plates the heat exchange medium can be led to travel through the plate pack several times. The dividing plates are to their shape plates, which are advantageously arranged between the heat exchange plates forming the plate pack and which dividing plate extends outside the plate pack, so that the dividing plate is by its outer edge in contact with the inner surface of the inner shell. Thus the dividing plate can by its outer edge be attached to the inner surface of the inner shell and the ends of the dividing plate can be attached to the baffle plates. The dividing plate is attached, typically welded, by its outer edge to the inner surface of the inner shell and by its ends to the baffle plates. Alternatively the dividing plates can be separate shaped plate-like pieces, which can be tightly attached by their inner edge, for example welded, to the outer surface of the plate pack. Also in this case the dividing plates are attached by their outer edge to the inner surface of the inner shell and the ends of the dividing plates are attached to baffle plates arranged on the outer surface of the plate pack.

When arranging a dividing plate between the heat exchange plates, adjacent heat exchange plates are typically welded by their outer perimeter to the dividing plate arranged between the heat exchange plates. The dividing plate can in some cases be used in the same way as a heat exchange plate, whereby the dividing plate is formed from a grooved plate. A smooth plate is however advantageously used.

Arranging dividing plates in the heat exchanger according to the invention is possible due to a separate inner shell in the structure, because thus the dividing plates can be attached to the inner shell, which is advantageously manufactured from the same material as the dividing plates. Thus the attaching of the dividing plates to the outer shell functioning as a pressure vessel is avoided.

In a heat exchanger according to one embodiment of the invention at least one dividing plate in the direction of the heat exchange plates has been arranged between the baffle plates forming the flow channel. The number of dividing plates in the flow channel can be freely selected depending on the purpose of the heat exchanger and the desired heat exchange properties. The number of dividing plates in the flow channel may be different in different flow channels of the heat exchanger. Some of the flow channels may comprise one or several dividing plates, and some of the flow channels do not comprise dividing plates. In the heat exchanger according to the invention the length of the heat exchange surfaces of the primary and secondary sides of the heat exchanger, i.e. how many times the flow travels through the plate pack between its inlet and outlet connections, can thus freely be modified with the aid of dividing plates.

With a sufficient number of passes formed by the dividing plate, the cross-flow heat exchanger according to the invention can be made to function in the same way as a counter-flow heat exchanger, whereby the outlet temperatures of the heat exchange mediums can be crossed, i.e. with the heat exchanger according to the invention the outlet temperature of the flow medium to be heated can be higher than the outlet temperature of the heating flow medium.

In a preferred embodiment of the invention four baffle plates have been arranged on the outer surface of the plate pack, which baffle plates are substantially perpendicular to the surface of the plate pack, which baffle plates thus form four separate flow channels in the heat exchanger. The inlet and outlet connections for the first heat exchange medium are arranged in contact with one flow channel and the inlet and outlet connections for the second heat exchange medium are arranged in contact with a second flow channel, whereby two of the flow channels do not comprise connections for heat exchange medium. Dividing plates are arranged in the flow channels for forming passes into the flow channel, so that it is possible to lead heat exchange medium from the inlet connection into the flow channel and to remove it through the outlet connection from the same flow channel formed by the baffle plates. The flow channel comprising an inlet and outlet connection comprises at least one dividing plate.

In one embodiment of the invention an even number of dividing plates has been arranged in the flow channel delimited by the baffle plates and comprising an inlet and outlet connection for heat exchange medium, in order for it to be possible to lead the flow in and out through the same flow channel. The heat exchange medium travels from the flow channel through the plate pack to a flow channel on the opposite side of the plate pack, where an odd number of dividing plates has been arranged, and from there further through the plate pack back to the flow channel, which comprises an outlet connection. The heat exchange medium can with the aid of the dividing plates arranged in the flow channel be arranged to travel several times through the plate pack, whereby the heat exchange surface area can be increased.

In the heat exchanger according to the invention the inlet and outlet connections for the first and second heat exchange medium are arranged through the outer casing and inner shell and/or inner end plate in contact with the flow channel.

In the heat exchanger according to the invention the connections on the primary and secondary side can be placed either on the shell or in the ends of the heat exchanger. In the heat exchanger according to the invention the locations of the inlet and outlet connections can also be almost freely selected. In the heat exchanger according to one embodiment of the invention one or more inlet or outlet connections are arranged through the end plates. The connections can be placed through the shell, through the end plates of one end or through the end plates of both ends or so that some of the connections are arranged through the end plates and some through the shell. Thus the structure of the heat exchanger can be selected according to need at any time. Connections arranged in the end/ends of the heat exchanger are advantageously arranged in the end structure in such a way that the connections open in connection to the flow channels.

In a preferred embodiment of the heat exchanger according to the invention the inner shell and the inner end plates are manufactured from the same material as the heat exchange plates forming the plate pack. Also the baffle plates and the dividing plates are advantageously manufactured from the same material. In one preferred embodiment the heat exchange plates, baffle plates, inner shell and inner end plates are manufactured from stainless steel, titanium or nickel-based steels. The outer shell and the end plates which make up the outer casing of the heat exchanger, against which the inner shell and the inner end plates are supported, can be manufactured from high-strength pressure vessel steel.

The inner shell of the heat exchanger according to the invention is typically manufactured from a plate, which is about 0.5-1.5 mm thick. The thickness of the outer casing functioning as a pressure vessel depends among others on the diameter and pressure classification of the heat exchanger. The thickness of the shell of the outer casing is typically in the range of 5-200 mm.

The heat exchanger according to the invention is very well suited for use in difficult circumstances, because all the surfaces which come into contact with the heat exchange mediums can be manufactured from a thin plate material, and a separate thicker outer shell, which functions as a pressure vessel, can be arranged around it. The plate pack and the inner shell can for example be manufactured from a 0.7 mm steel plate, which can withstand about 400 bar of pressure, whereby the internal pressure differences in the heat exchanger between different heat exchange mediums can vary in the order of 200 bar.

The plate pack of the heat exchanger according to the invention is composed by attaching profiled heat exchange plates together on top of each other, so that the first heat exchange medium flows in every other plate space and the second heat exchange medium in every other. The heat exchange plates are typically welded together at desired spots on their outer edges. The height of the profile of the heat exchange plates determines, at least partly, the distance between the heat exchange plates, i.e. the size of the flow routes formed between the heat exchange plates. The effect of the heat exchanger can be affected for example by selecting the material, thickness, surface area, profile shape and height of the heat exchange plates as desired. The ridge angles between the plates can be freely selected, whereby the viscosities and densities of different substances can be taken into account in the dimensioning. The soiling properties and cleansing ability of different substances on the plate surfaces can also be taken into account in the dimensioning stage by selecting the correct ridge angle.

A circular plate pack has advantageously been fitted inside the shell of the heat exchanger according to the invention, such as in Plate and Shell type plate heat exchangers. The heat exchange plates of the heat exchanger according to the invention do however not have small openings as in the typical heat exchange plates of the Plate and Shell type heat exchangers, but the heat exchange plates are solid whole surfaces, whereby the heat exchange surfaces can be increased in comparison to models with openings. The flow circumstances between the heat exchange plates improve and the flow is divided evenly in the plate spaces, because fringe areas caused by the small openings are not formed, and the flow circumstances on the primary and secondary sides can be arranged to be the same.

In a preferred embodiment of the invention the plate pack, the inner shell and the shell of the outer casing have a circular cylindrical shape. Thus the flow channels formed with the aid of the baffle plates in the heat exchanger between the inner shell and the outer surface of the plate pack have the cross-sectional shape of a section of a circular ring.

The structure of a heat exchanger according to a preferred embodiment of the invention is completely welded, where no rubber-sealed flow guides are used in the structure, i.e. the structure is unsealed. A completely welded structure means that the different parts of the heat exchanger are attached to each other by welding. The plate pack is composed by welding heat exchange plates to each other, the baffle plates are welded to the outer surface of the plate pack, the inner shell and inner end plates are welded to the structure, and also the dividing plates are welded to the structure. The shell of the outer casing and the end plates are typically welded together, if the structure is made impossible to open. In an opening heat exchanger according to the invention the outer casing comprises parts, which are attached in a detachable manner by means of bolts or the like.

As was already mentioned above, the locations of the flow channels and inlet and outlet connections of the heat exchanger according to the invention and the number of dividing plates to be arranged in the flow channels can be selected freely, whereby the heat exchanger can be built to suit its purpose. The placement of the baffle plates can be used to affect the size of the flow channel being formed, the flow channels can be constructed to be identical on the primary and secondary sides, or alternatively the flow channel on one side can be constructed to be larger. The entire outer perimeter of the plate pack is advantageously used as flow channels for the heat exchange medium.

The plate heat exchanger according to the invention is structurally simple. The structure of the heat exchanger can easily be modified, because a heat exchanger suitable for different purposes can from the basic structure formed by the inner shell and plate pack easily be constructed by altering the placement and number of baffle plates, dividing plates and connections. The heat exchanger according to the invention can also easily be constructed to function with more than two heat exchange mediums. The heat exchanger according to the invention can be used in liquid/liquid, liquid/gas and gas/gas applications.

A typical method according to the invention for manufacturing a plate heat exchanger comprises forming a plate pack, where heat exchange plates have been attached together on top of each other, arranging baffle plates in the longitudinal direction of the plate pack on the outer surface of the plate pack substantially perpendicular to the plate pack, so that the inner edge of the baffle plates is attached to the outer surface of the plate pack, arranging an inner shell around the plate pack and the baffle plates arranged on its surface, which inner shell is attached to the outer edges of the baffle plates, whereby the inner shell is at least mainly at a distance from the outer surface of the plate pack, arranging inner end plates to the structure, which are in the direction of the ends of the plate pack and which inner end plates are attached to the inner shell, arranging an outer casing of the heat exchanger around the inner shell, which outer casing comprises end plates mainly in the direction of the ends of the plate pack and a shell connecting the end plates, against the inner surface of which shell the outer surface of the inner shell is arranged and the inner end plates are arranged tightly against the end plates of the outer casing, and arranging inlet and outlet connections through the outer casing and inner shell and/or inner end plates for at least a first and a second heat exchange medium.

Dividing plates in the direction of the heat exchange plates can during the assembly of the heat exchanger be arranged in the flow channels, which are formed between the outer surface of the plate pack, the inner surface of the inner shell and the baffle plates arranged on the outer surface of the plate pack. The dividing plates are advantageously arranged between the heat exchange plates composing the plate pack during the assembly of the plate pack. The inner shell is thus also attached to the outer edge of the dividing plates.

SHORT DESCRIPTION OF THE FIGURES

In the following, the invention will be described in more detail with reference to the appended schematic drawing, in which.

DETAILED DESCRIPTION OF THE INVENTION

In the heat exchangers according to the invention which are shown in FIGS. 1-6, the same reference numbers have been used for parts corresponding to each other, even though the parts marked with the same reference numbers can be different in different examples.

Figure 1:
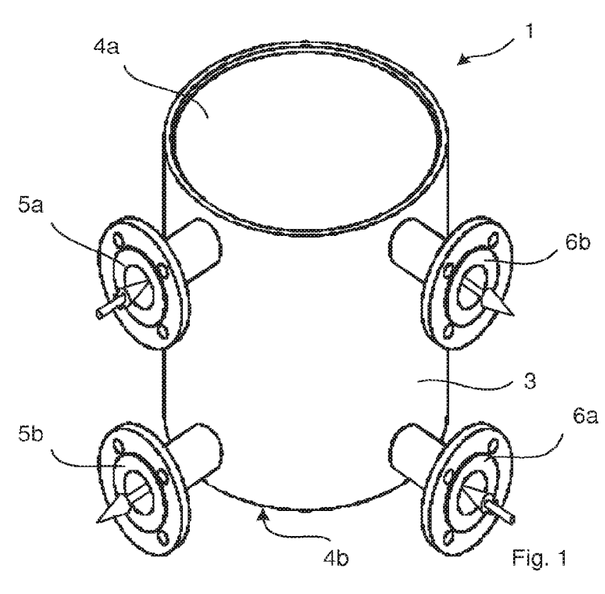
FIG. 1 shows a heat exchanger according to the invention seen from the outside.

FIG. 1 shows as an example a heat exchanger according to the invention seen from the outside. The heat exchanger 1 has a cylindrical outer casing functioning as a pressure vessel, which comprises a shell 3 and end plates 4a, 4b. A plate pack (not shown in the figure) arranged inside the heat exchanger is arranged between the end plates 4a, 4b. The shell 3 and the end plates 4a, 4b functioning as the outer casing of the heat exchanger can be assembled and joined together by welding, whereby the structure cannot be opened, as shown in FIG. 1. In FIG. 1 inlet connections 5a, 6a and outlet connections 5b, 6b for a first and a second heat exchange medium have been arranged through the shell 3 of the heat exchanger. Arrows have been used in the figure to illustrate the flows of the heat exchange mediums. The inlet and outlet connections 5a, 5b, 6a, 6b can be arranged in the shell, end and/or ends of the heat exchanger. The connections are advantageously welded to the outer casing of the heat exchanger. The heat exchanger according to the invention generally has at least four connections, two inlet connections and two outlet connections. More connections can however also be arranged, whereby the heat exchanger can be used for more than two heat exchange mediums.

Figure 2:
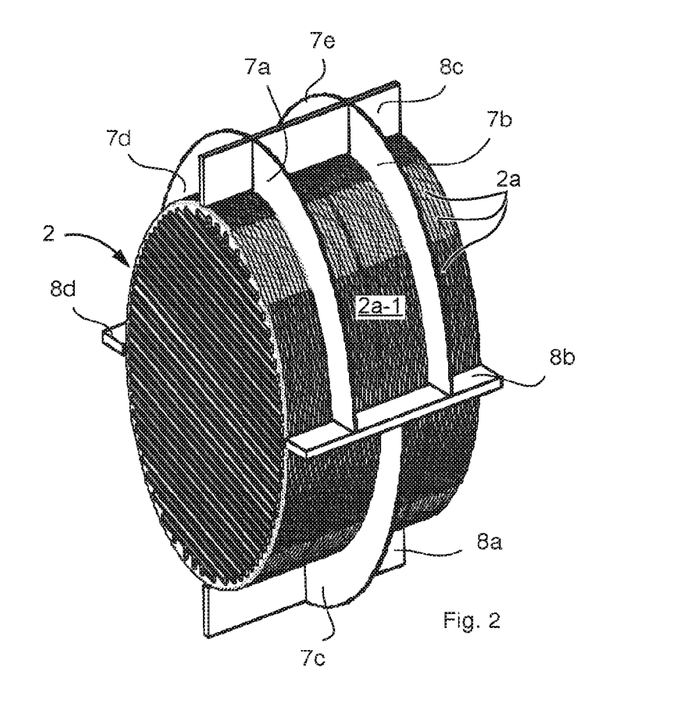
FIG. 2 shows the plate pack of a plate heat exchanger according to the invention and the baffle plates and dividing plates arranged on the outer surface of the plate pack.

FIG. 2 shows the plate pack 2 of a heat exchanger according to the invention. The baffle plates 8a, 8b, 8c, 8d are attached to the outer plate pack surface 2a-1 established by the outer perimeters of the stacked plates 2 so as to form flow channels for heat exchange mediums in the longitudinal direction of the plate pack 2. The baffle plates 8a, 8b, 8c, 8d are arranged substantially perpendicularly against the outer plate pack surface 2a-1 and extend from one end of the plate pack 2 to the other. The baffle plates 8a, 8b, 8c, 8d are attached by their inner edge to the outer plate pack surface 2a-1. In the example in FIG. 2 four baffle plates 8a, 8b, 8c, 8d have been arranged on the outer plate pack surface 2a-1, whereby four flow channels are formed in the completed heat exchanger between the baffle plates when the inner shell is attached to the outer edge of the baffle plates.

FIG. 2 also shows dividing plates 7a, 7b, 7c, 7d, 7e in the direction of the heat exchange plates and arranged on the outer surface of the plate pack, which divide the flow channels formed by the baffle plates 8a, 8b, 8c, 8d into separate sections in the longitudinal direction of the plate pack 2, whereby the plate pack of the heat exchanger can be made multi-driven. The dividing plates 7a, 7b, 7c, 7d, 7e are advantageously arranged between the heat exchange plates, whereby the parts of the dividing plate, which remain outside the plate pack 2 and have the shape of a section of a circular ring, function as partition walls for the passes formed in the flow channels. Alternatively the dividing plates 7a, 7b, 7c, 7d, 7e can have been manufactured from separate strips, which are attached at their inner edge to the outer surface of the plate pack. The dividing plates 7a, 7b, 7c, 7d, 7e are attached by their outer edge to the inner shell and by their ends to the baffle plates 8a, 8b, 8c, 8d.

The plate pack 2 has been formed from circular profiled plates 2a, which have been stacked on top of each other and attached together at their outer perimeters so as to establish the outer plate pack surface 2a-1 and to allow a first heat exchange medium to flow in every other plate space and a second heat exchange medium to flow in the remaining plate space. The heat exchange mediums are led via the flow channels delimited by the baffle plates 8a, 8b, 8c, 8d to the plate pack 2 and out of the plate pack 2. The height of the profile of the heat exchange plates determines, at least partly, the distance between the heat exchange plates, i.e. the size of the flow routes formed between the heat exchange plates. The ridge angle between the bulges of opposite heat exchange plates can be freely selected.

Figure 3:
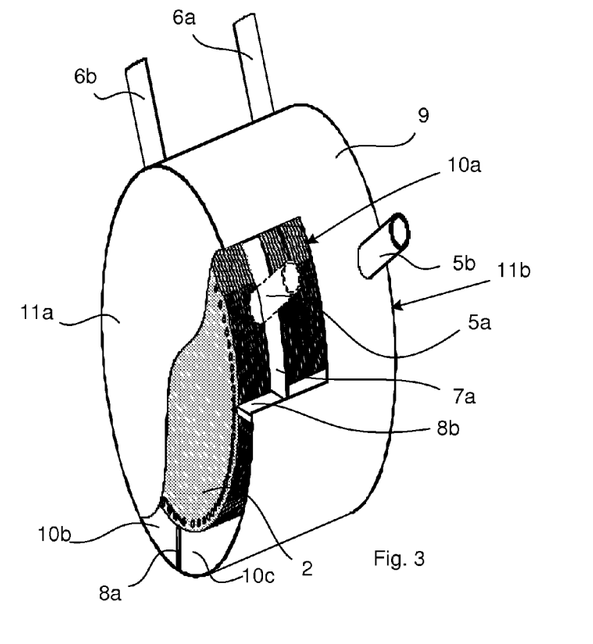
FIG. 3 shows a partly opened inner shell of a heat exchanger according to the invention and the plate pack arranged therein.

FIG. 3 shows a partly opened inner shell 9 of a heat exchanger according to the invention, inside which the plate pack 2 has been arranged. The inner shell 9 of the heat exchanger surrounds a circular plate pack 2 composed from superposed heat exchange plates. The inner end plates 11a, 11b are in the direction of the ends of the plate pack and they are attached to the inner shell 9. The inner shell 9 of the heat exchanger is arranged at a distance from the outer surface of the plate pack 2 and to surround the plate pack 2 completely, whereby space is substantially left between the plate pack 2 and the inner shell 9 over the entire area of the outer surface of the plate pack. Baffle plates 8a, 8b, 8c, 8d, which have the length of the plate pack 2, have been arranged between the plate pack 2 and the inner shell 9, which baffle plates are attached, advantageously welded, by their inner edge to the outer surface of the plate pack, by their outer edge to the inner surface of the inner shell and by their ends to the inner end plates 11a, 11b. The height of the baffle plate, i.e. the distance between the inner shell 9 and the plate pack 2, can for example be 5-200 mm.

Flow channels 10a, 10b, 10c are formed in the space delimited by the baffle plates 8a, 8b, 8c, 8d, the outer surface of the plate pack 2 and the inner shell 9, via which flow channels the heat exchange medium can flow into the plate pack and correspondingly out of it. Inlet connections 5a, 6a and outlet connections 5b, 6b of the heat exchange mediums have been connected with the flow channels 10a, 10b, 10c. A dividing plate/dividing plates 7a have been arranged between two baffle plates, which dividing plates divide the flow channel between the baffle plates into several sections in the longitudinal direction of the plate pack. Thus the inlet connection 5a and the outlet connection 5b of the heat exchange medium can be situated in the same flow channel 10a.

By each flow channel 10a, 10b, 10c every other plate space between superposed heat exchange plates is open, so that the flow can transfer from the flow channel into these plate spaces or vice versa, and every other plate space is closed, so that the passage of the flow into these plate spaces is prevented. The plate spaces, which are open to the flow of the first heat exchange medium, are thus closed from the second heat exchange medium, and correspondingly the open plate spaces of the second heat exchange medium are closed from the first heat exchange medium. Thus the first and the second heat exchange medium are led through every other plate space through the plate pack of the heat exchanger so that their flows are not mixed together.

The location of the baffle plates 8a, 8b, 8c, 8d functioning as flow guides can be freely selected, whereby it is possible to alter the heat exchange surface area of the plate pack used by the heat exchange medium. Also the location of the dividing plates 7a, 7b, 7c, 7d, 7e can be freely selected, so that the flows of the heat exchange mediums can be made to travel in a desired manner from the inlet connection 5a, 6a to the outlet connection 5b, 6b.

Figure 4:
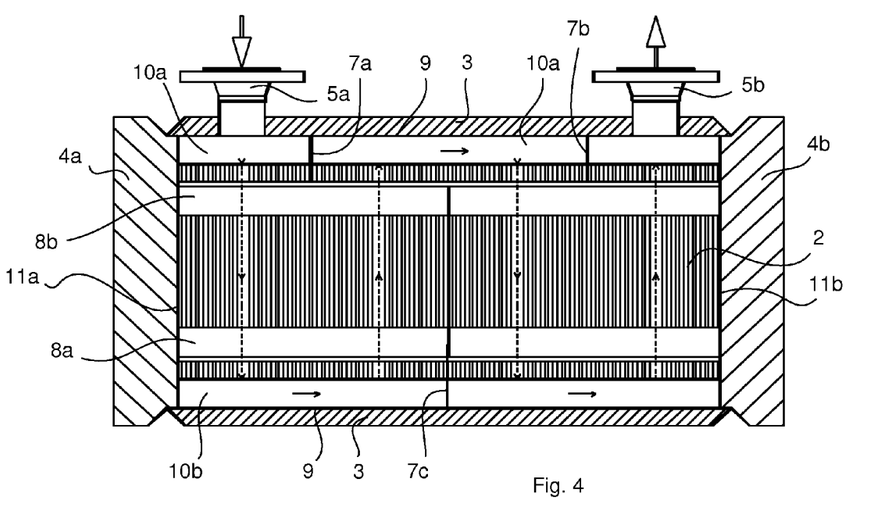
FIG. 4 shows a cross-section of a heat exchanger according to the invention.

FIG. 4 shows a cross-section of a heat exchanger according to the invention. Flow channels 10a, 10b for one heat exchange medium formed between the plate pack 2 and the inner shell 9 can be seen in the figure. The flow channels are formed with the aid of baffle plates 8a, 8b attached to the outer surface of the plate pack 2. A flow channel for the second heat exchange medium is left between the baffle plates 8a, 8b shown in the figure. The inlet connection 5a and the outlet connection 5b are arranged through the outer shell 3 and the inner shell 9 to be in connection with the flow channel 10a. Dividing plates 7a, 7b, 7c are arranged in the flow channels 10a, 10b, by means of which dividing plates the heat exchange medium can be made to travel several times through the plate pack 2. Inner end plates 11a, 11b in the direction of the ends of the plate pack are arranged tightly against the end plates 4a, 4b of the outer casing.

The flow of one heat exchange medium from the inlet connection 5a of the heat exchanger to the outlet connection 5b is illustrated in FIG. 4 with arrows. The heat exchange medium flows from the inlet connection 5a into the flow channel 10a and further through the plate pack 2 into the flow channel 10b, from where the flow is led through the plate pack 2 back into the flow channel 10a. With the aid of the dividing plate 7b the flow can be led once more to the opposite side of the plate pack before the flow is led via the flow channel 10a to the outlet connection 5b.

Figure 5:
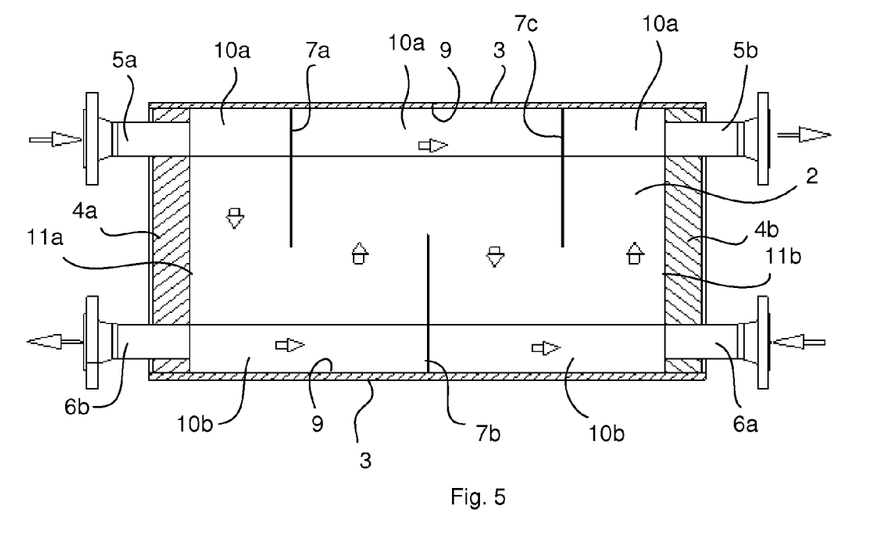
FIG. 5 shows a schematic cross-section of another heat exchanger according to the invention, where the inlet and outlet connections are arranged in the ends of the heat exchanger.

FIG. 5 shows a heat exchanger according to the invention as a schematic cross-section, in which heat exchanger the connections 5a, 5b, 6a, 6b are arranged through the outer end plates 4a, 4b and the inner end plates 11a, 11b of the heat exchanger. The figure shows with arrows the flow route of the first heat exchange medium from the inlet connection 5a via the flow channel 10a through the plate pack 2 to the flow channel 10b on the opposite side of the plate pack and further through the plate pack back into the flow channel 10a and a second time through the plate pack 2 into the flow channel 10b and back via the flow channel 10a to the outlet connection 5b. The dividing plates 7a, 7b, 7c divide the flow channels 10a, 10b into several sections, which makes possible the flow several times through the plate pack. The flow channels 10a and 10b are situated on opposite sides of the plate pack. The flow channels of the second heat exchange medium (not shown in the figure) are arranged in a corresponding manner, which flow channels are in contact with the inlet and outlet connections 6a, 6b.

Figure 6:
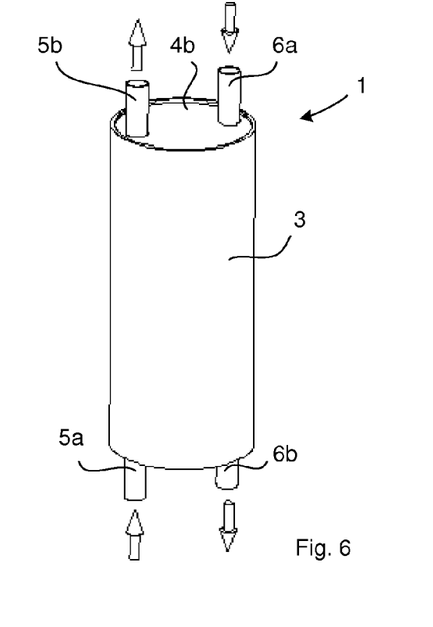
FIG. 6 shows the heat exchanger according to FIG. 5 seen from the outside.

FIG. 6 shows the heat exchanger of FIG. 5 from the outside. The outer shell 3 is arranged around the structure of FIG. 5.

The invention is not intended to be limited to the above-presented exemplary embodiments, but the intention is to apply the invention widely within the inventive idea defined by the claims defined below.

The invention claimed is:

1. A plate heat exchanger which comprises:
   a plate pack formed by heat exchange plates arranged on top of each other such that outer perimeters of the heat exchange plates establish an outer plate pack surface,
   an outer casing surrounding the plate pack, wherein the outer casing comprises separated outer end plates positioned adjacent to respective ends of the plate pack and an outer shell connecting the outer end plates, wherein the outer shell has an inner surface which is spaced from the outer plate pack surface,
   first and second pairs of inlet and outlet connections for a first exchange medium and a second heat exchange medium, respectively,
   baffle plates oriented in a longitudinal direction of the plate pack, wherein the baffle plates are arranged on the outer plate pack surface substantially perpendicular to the plate pack, the baffle plates comprising respective inner and an outer edges, wherein the inner edges of the baffle plates are arranged so as to be in contact with the outer plate pack surface,
   a first flow channel defined between the baffle plates which extends from the inlet connections to the plate pack and a second flow channel defined between the baffle plates which extends from the plate pack to the outlet connections, wherein the first and second flow channels allow for flow of the first heat exchange medium and the second heat exchange medium between the paired inlet and outlet connections, respectively, an inner shell surrounding the plate pack, the inner shell having inner and outer surfaces, the inner surface of the inner shell being attached to the outer edges of the baffle plates and the outer surface of the inner shell having a shape corresponding to the inner surface of the outer shell of the outer casing and being supported against the inner surface of the outer shell of the outer casing, and first and second inner end plates each having an outer surface which is supported against a respective inner surface of the outer end plates of the outer casing.

2. The plate heat exchanger according to claim 1, wherein the baffle plates extend in a longitudinal direction of the plate pack from the first inner end plate to the second inner end plate.

3. The plate heat exchanger according to claim 1, wherein the inner edges of the baffle plates are attached to the outer edges of the heat exchange plates forming the plate pack, and wherein outer edges of the baffle plates are attached to the inner surface of the inner shell and opposed end edges of the baffle plates are respectively attached to the first and second inner end plates.

4. The plate heat exchanger according to claim 1, which further comprises at least one dividing plate which is oriented in a direction of the heat exchange plates and positioned between a pair of the baffle plates, wherein the dividing plate is arranged between an adjacent pair of the heat exchange plates forming the plate pack and extends outwardly of the plate pack so that an outer edge of the dividing plate is in contact with the inner surface of the inner shell and opposed ends of the dividing plate are attached to the a respective one of the baffle plates.

5. The plate heat exchanger according to claim 1, wherein
the heat exchanger comprises four baffle plates which respectively establish separate first, second, third and fourth flow channels in the heat exchanger, and wherein
the first pair of inlet and outlet connections for the first heat exchange medium is arranged to be in fluid communication with one of the flow channels, and wherein
the second pair of inlet and outlet connections for the second heat exchange medium is arranged to be in fluid communication with a second one of the flow channels, and wherein
the third and fourth flow channels do not comprise connections for either the first medium or the second heat exchange medium.

6. The plate heat exchanger according to claim 5, which further comprises:
a plurality of dividing plates each being oriented in a direction of the heat exchange plates and positioned between a pair of the baffle plates, wherein the dividing plates have an outer edge in contact with the inner surface of the inner shell and opposed ends attached to a respective one of the baffle plates, wherein
the first and second flow channels which comprise the first and second pairs of inlet and outlet connections for the first heat exchange medium and the second heat exchange medium, respectively, are arranged with an even number of the dividing plates, and wherein
the third and fourth flow channels on an opposite side of the plate pack relative to the first and second flow channels comprise an odd number of the dividing plates.

7. The plate heat exchanger according to claim 1, wherein the first and second pairs of inlet and outlet connections are arranged through the outer end plates of the outer casing and through the inner end plates in contact therewith.

8. The plate heat exchanger according to claim 1, wherein the inner shell and the inner end plates are formed of the same material as the material forming heat exchange plates of the plate pack, and wherein the material forming the inner shell, the inner end plates and the heat exchange plates differs from the material of the outer casing.

9. The plate heat exchanger according to claim 1 wherein the heat exchange plates, the baffle plates, the inner shell and the inner end plates are formed of a stainless steel, titanium or a nickel-based steel.

10. The plate heat exchanger according to claim 1, wherein the inner shell is manufactured from a plate which is 0.5-1.5 mm thick, and wherein the outer shell of the outer casing has a thickness which is 5-200 mm.

11. The plate heat exchanger according to claim 1, wherein the plate pack is comprised of profiled heat exchange plates attached together on top of each other so as to define plate spaces therebetween, and wherein the first heat exchange medium and the second heat exchange medium flow in respective alternating every other one of the plate spaces.

12. The plate heat exchanger according to claim 1, wherein the plate pack, the inner shell and the outer shell of the outer casing have a circular cylindrical shape.

13. The plate heat exchanger according to claim 1, wherein the structure of the heat exchanger is completely welded.

14. A method for manufacturing a plate heat exchanger comprising:
(a) forming a plate pack by attaching a stack of heat exchange plates to each other such that outer perimeters of the heat exchange plates establish an outer plate pack surface,
(b) arranging an outer casing around the plate pack, wherein the outer casing comprises separated outer end plates positioned adjacent to respective ends of the plate pack and an outer shell connecting the outer end plates, wherein the outer shell has an inner surface which is spaced from the outer plate pack surface,
(c) arranging first and second pairs of inlet and outlet connections for a first exchange medium and a second heat exchange medium, respectively,
(d) arranging baffle plates so that the baffle plates are oriented in a longitudinal direction of the plate pack, wherein the baffle plates are arranged on the outer plate pack surface substantially perpendicular to the plate pack, the baffle plates comprising respective inner and an outer edges, wherein the inner edges of the baffle plates are arranged so as to be in contact with the outer plate pack surface,
(e) forming a first flow channel defined between the baffle plates which extends from the inlet connections to the plate pack and a second flow channel defined between the baffle plates which extends from the plate pack to the outlet connections, wherein the first and second flow channels allow for flow of the first heat exchange medium and the second heat exchange medium between the paired inlet and outlet connections, respectively, (f) arranging an inner shell around the plate pack, the inner shell having inner and outer surfaces, the inner surface of the inner shell being attached to the outer edges of the baffle plates and the outer surface of the inner shell having a shape corresponding to the inner surface of the outer shell of the outer casing and being supported against the inner surface of the outer shell of the outer casing, and (g) arranging first and second inner end plates each having an outer surface which is supported against a respective inner surface of the outer end plates of the outer casing.

15. The method according to claim 14, which comprises attaching the baffle plates by (i) welding inner edges of the baffles to the plate pack, (ii) welding outer edges of the baffles to the inner surface of the inner shell and (iii) welding opposed end edges of the baffles to the first and second inner end plates, respectively.

16. The method according to claim 14, which further comprises:

(h) arranging at least one dividing plate so as to be oriented in a direction of the heat exchange plates and positioned between a pair of the baffle plates, wherein the dividing plate is arranged between an adjacent pair of the heat exchange plates forming the plate pack and extends outwardly of the plate pack so that an outer edge of the dividing plate is in contact with the inner surface of the inner shell and opposed ends of the dividing plate are attached to a respective one of the baffle plates.

17. The method according to claim 14, wherein step (c) comprises arranging the first and second pairs of inlet and outlet connections through the outer end plates of the outer casing and through the inner end plates in contact therewith.

* * * * *